Feb. 26, 1952

C. W. LUNDY, SR 2,586,967

TRAP FOR SEWER CATCH BASINS

Filed April 27, 1949

Inventor

Charles W. Lundy, Sr.

By Clarence A. O'Brien and Harvey B. Jacobson
Attorneys

Feb. 26, 1952   C. W. LUNDY, SR   2,586,967
TRAP FOR SEWER CATCH BASINS
Filed April 27, 1949
2 SHEETS—SHEET 2

Inventor
Charles W. Lundy, Sr.

By Clarence A. O'Brien
and Harvey B. Jacobson
Attorneys

Patented Feb. 26, 1952

2,586,967

UNITED STATES PATENT OFFICE 2,586,967

TRAP FOR SEWER CATCH BASINS

Charles W. Lundy, Sr., North Charleroi, Pa.

Application April 27, 1949, Serial No. 89,975

4 Claims. (Cl. 182—2)

This invention relates to a trap for use with a sewer catch basin, the primary object of which is to catch the sediment in surface water and prevent it from being carried into the sewer and clogging up the same.

A further object of this invention is to provide a trap of the character described which can be built light and strong and which is provided with means on the sides of the trap whereby the latter may be readily and easily raised from the basin.

A further object of this invention is to provide a trap of the character described including a housing having hinged doors at its bottom end and a novel latch means which can be operated by a hammer blow to unlatch the doors and empty the trap of the sediment caught therein.

And a further object of this invention is to provide in a sewer catch basin, a sediment trap comprising a housing open at its upper end, means for detachably retaining said housing in said basin, means for raising said housing from said basin, trap doors, means for hinging said trap doors at the bottom end of said housing, releasable latch means carried by said trap doors, and surface water-drainage ports in the sides of said housing.

These, together with various ancillary objects and features of the invention which will later become apparent as the following description proceeds, are attained by the device, a preferred embodiment of which has been illustrated, by way of example only, in the accompanying drawings, wherein.

Specific reference will now be made to the drawings. In the several views in the accompanying drawings and in the following specification, similar reference characters indicate corresponding elements throughout.

Figure 1:
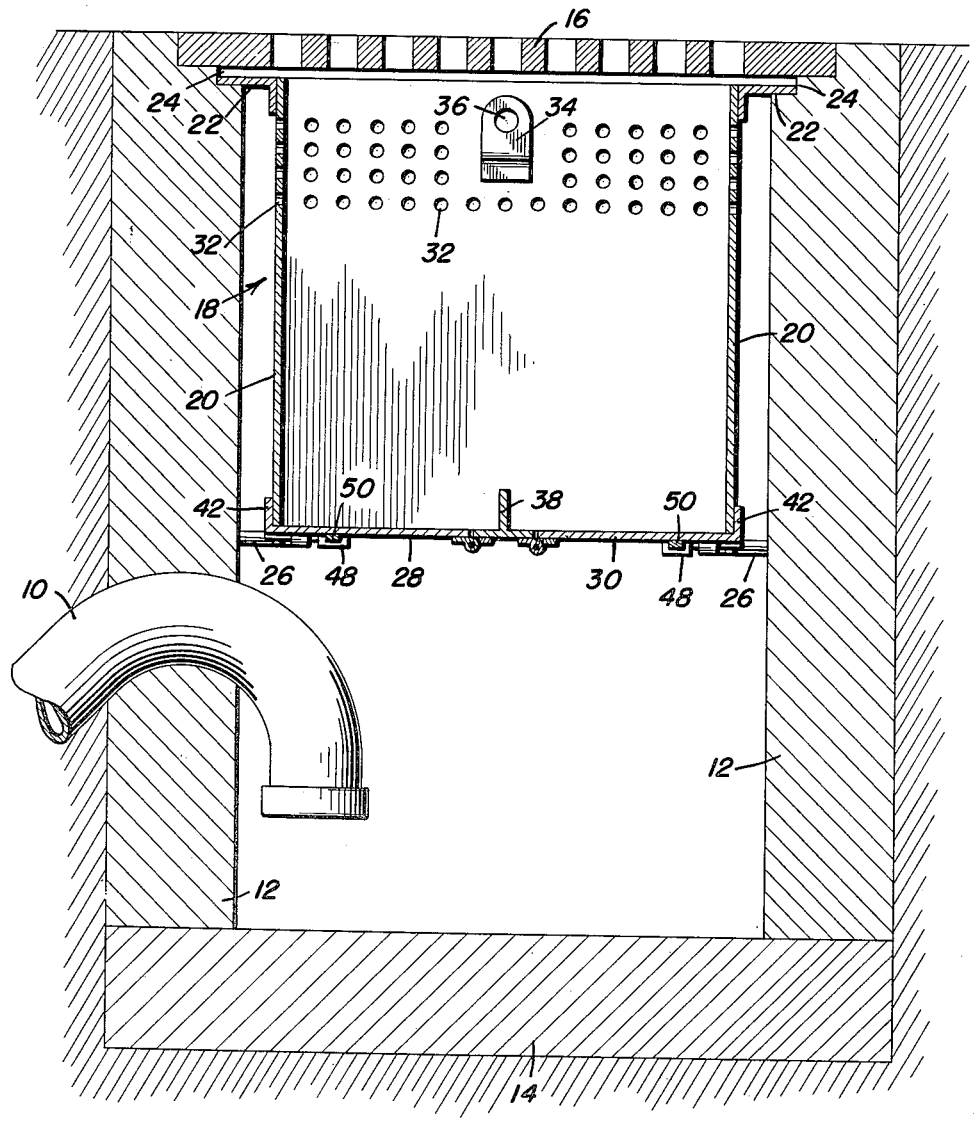
Figure 1 is a vertical sectional view through the trap shown suspended in a catch basin.

Indicated generally at 10 is the ordinary siphon pipe shown extending into a conventional catch basin formed of brick walls 12, a concrete foundation 14, and the standard grating 16 removably supported at the top of the catch basin. The trap of the instant invention is generally indicated at 18 and is preferably substantially rectangular in shape and consists of a housing or receptacle having sheet metal side walls 20. Welded adjacent the top edge of the side walls is a peripheral flange 22 which engages a recess 24 in the brick wall 12 of the catch basin. Extending interiorly of the catch basin from the walls 12 are iron pegs 26 which engage the doors 28 and 30. Thus, it will be seen that the trap housing is removably suspended in the catch basin on the brick walls thereof.

Adjacent the upper edge of the walls 20 of the trap is a plurality of apertures 32 forming drainage ports allowing free flow of surface water therethrough. Also adjacent the upper edges of the side walls and welded thereto are a pair of lugs 34 having apertures 36 adapted to engage sling hooks (not shown) for lifting the trap out of the catch basin.

Figure 4:
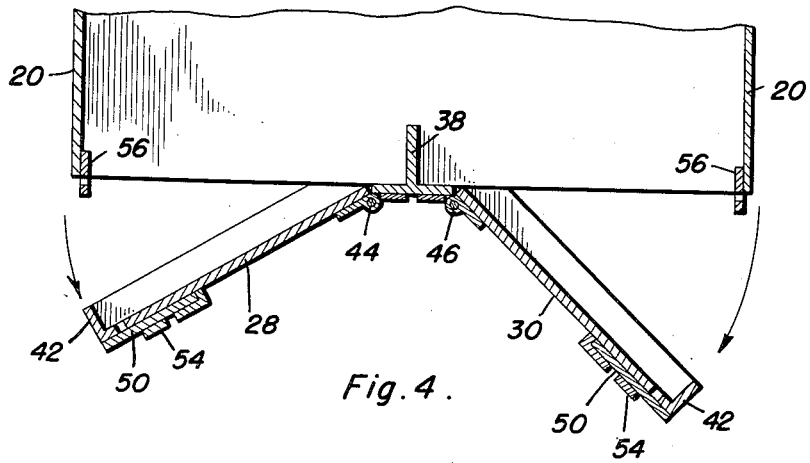
Figure 4 is a fragmentary vertical sectional view through the trap illustrating the open position of the doors.
Figure 5:
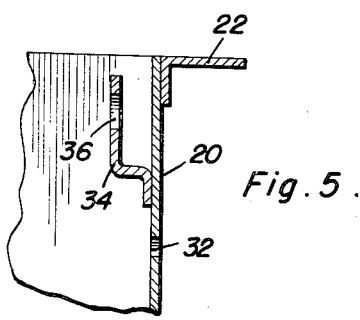
Figure 5 is a sectional view taken substantially in the plane of section line 5—5 of Figure 2.

Extending across the bottom of the trap is an inverted T-shaped bar 38 which is retained on the side walls of the housing or trap by means of upstruck lugs 40 welded to the inner surfaces of the walls. The outer edges of the trap doors 28 and 30 are provided with peripheral flanges 42 adapted to embrace the bottom edges of the side walls 20 when the doors are in a closed position as shown clearly in Figure 1. At their inner edges, the doors 28 and 30 are respectively hinged as at 44 and 46 to the horizontal legs of the inverted T-shaped bar 38. The doors are hinged to swing downwardly into an open position as shown clearly in Figure 4.

Figure 6:
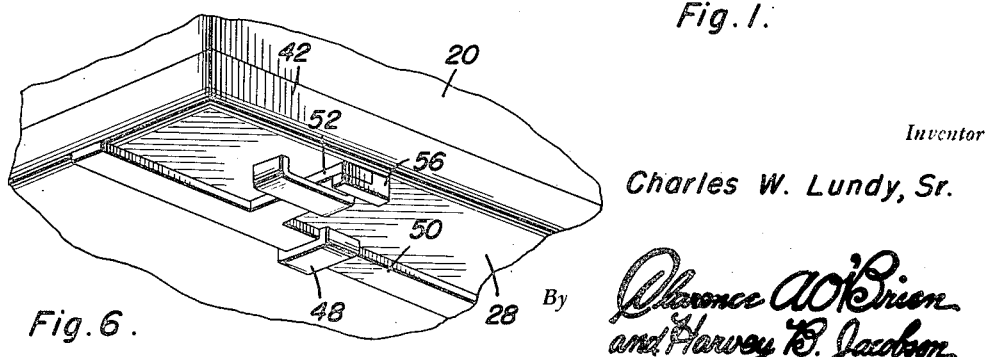
Figure 6 is a fragmentary perspective view of the latch means.
Figure 2:
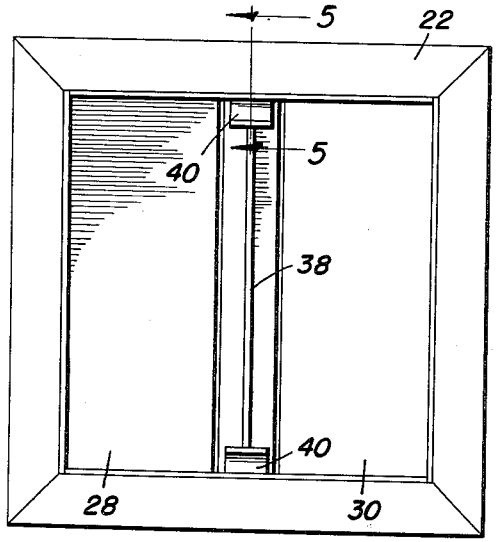
Figure 2 is a top plan view of the trap.
Figure 3:
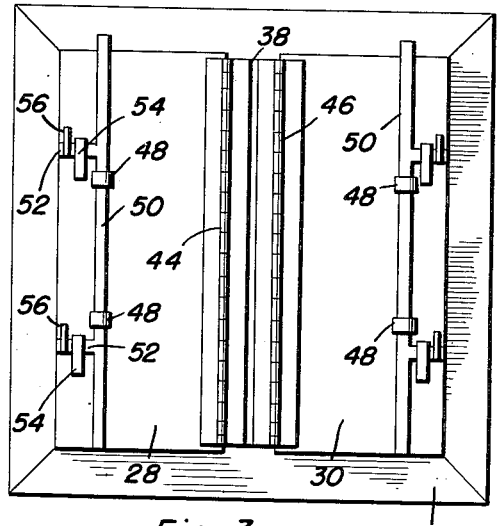
Figure 3 is a bottom plan view of the trap.

A novel latch means is provided for retaining the doors in a closed position, which will be described immediately hereinafter. Each of the doors is provided with guide sleeves 48 for slidably receiving latch bars 50. Intermediate their ends, each latch bar is provided with laterally extending lugs 52 which are, in turn, slidably received in further guide sleeves 54 carried by each of the trap doors 28 and 30. Welded to the inner surfaces of the side walls 20 of the housing are L-shaped lugs or keepers 56 for receiving and retaining the lugs 52 when one end of the latch bar is moved to underlie a bottom edge of one of the side walls, as shown clearly in Figures 3 and 6.

In practical operation, the trap or housing is suspended within the catch basin beneath the grill 16 as shown clearly in Figure 1. Surface water passing through the grill will enter the trap, the sediment being retained therein and the excess surface water passing through the drain apertures 32, into the catch basin and through the siphon pipe 10. When the trap is substantially filled with sediment, the grill 16 is removed and then the trap is lifted by means of sling hooks engaging the apertured lugs 34. Once the trap is removed from the catch basin, a strong hammer blow against the latch bars 50 will release the lugs 52 from the keepers 56 and the trap doors 28 and 30 will open to release the sediment. Thereafter, the doors are again closed and the trap re-suspended within the catch basin for re-use.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In a sewer system, a catch basin and a sediment trap disposed therein, said trap comprising a receptacle open at its upper and lower ends and including side walls, an elongated member secured to opposing side walls of the receptacle and extending across the lower open end thereof, a pair of oppositely extending trap doors normally engaging the lower edges of the side walls and closing the lower open end of the receptacle, said trap doors having upstanding peripheral flanges embracing the lower edges of the side walls, said doors having their adjacent edges hinged to said member for downward swinging opening movement, means carried by the basin supporting the receptacle in spaced relation above the bottom of the basin and engaging the underside of the trap doors and retaining the same in closed position when the sediment trap rests upon such means, and means for releasably retaining the trap doors in closed position comprising a pair of spaced downwardly extending latch keepers carried by each opposite side wall, each trap door having spaced openings through which the latch keeper slidably extends when the doors are in closed position, and a latch bar slidably secured to the underside of each trap door and having means adapted to engage the adjacent latch keepers to lock same against downward opening of same when the trap is lifted from the supporting means.

2. The combination of claim 1, wherein the latch keepers are L-shaped, said latch bars being elongated, a guide on each trap door for guiding longitudinal reciprocation of the latch bar associated therewith, a lug extending laterally from each latch bar, and a guide sleeve carried by each trap door slidably receiving the lug to prevent rotation of the latch bar and also limiting longitudinal movement thereof.

3. In a sewer catch basin; a sediment trap comprising a receptacle open at its upper and lower ends and having side walls, means for removably positioning the receptacle in said basin, means for supporting the receptacle and for readily removing same from the basin, surface water-drainage ports in the side walls of said receptacle, an elongated member connecting opposing side walls of the receptacle and extending across the lower open end of the same, a pair of oppositely extending trap doors normally closing the lower end of the receptacle and having their adjacent edges hingedly connected to the member for downward swinging opening movement, said trap doors having upstanding peripheral flanges embracing the lower edges of the side walls, and means for releasably latching the trap doors in closed position.

4. In a sewer catch basin; a sediment trap comprising a receptacle open at its upper and lower ends and having side walls, means for removably positioning the receptacle in said basin, surface water-drainage ports in the side walls of said receptacle, an elongated member connecting opposing side walls of the receptacle and extending across the lower open end of the same, a pair of oppositely extending trap doors normally closing the lower end of the receptacle and having their adjacent edges hingedly connected to the member for downward swinging opening movement, said trap doors having upstanding peripheral flanges embracing the lower edges of the side walls, and means for releasably latching the trap doors in closed position comprising a pair of L-shaped latch keepers dependingly carried by each opposite side wall, each trap toor having spaced openings through which the latch keeper slidably extends when the doors are in closed position, a pair of elongated latch bars each having a laterally extending lug, means securing one of the latch bars to the underside of each of the trap doors for sliding longitudinal reciprocation, a guide sleeve carried by each of the trap doors slidably receiving the adjacent lug to prevent rotation of the latch bar and limit sliding movement thereof, said lug being selectively engageable with the adjacent latch keeper.

CHARLES W. LUNDY, Sr.

REFERENCES CITED

The following references are of record in the file of this patent:

UNITED STATES PATENTS

| Number | Name | Date |
|---|---|---|
| 75,549 | Ingram | Mar. 17, 1868 |
| 223,624 | DeWitt | Jan. 13, 1880 |
| 282,598 | Zimmerman | Aug. 7, 1883 |
| 1,661,370 | Kaser | Mar. 6, 1928 |
| 2,092,492 | Akers | Sept. 7, 1937 |
| 2,430,222 | Goldbert | Nov. 4, 1947 |

FOREIGN PATENTS

| Number | Country | Date |
|---|---|---|
| 438 | Great Britain | Jan. 11, 1888 |
| 3,380 | Great Britain | Mar. 5, 1888 |